US012658692B2

(12) United States Patent
Vudugula et al.

(10) Patent No.: US 12,658,692 B2
(45) Date of Patent: Jun. 16, 2026

(54) POWER CONTROL SYSTEM

(71) Applicant: Transportation IP Holdings, LLC, Norwalk, CT (US)

(72) Inventors: Sai Kumar Vudugula, Bangalore (IN); Rajendra Prasad Chittimalla, Bangalore (IN); Bret Worden, Erie, PA (US); Sarit Ratadiya, Bangalore (IN); Glenn Lovercheck, Erie, PA (US); Rajeev Verma, Bangalore (IN); Ajith Kuttannair Kumar, Ashburn, VA (US); Emil Nikolov, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 195 days.

(21) Appl. No.: 18/515,451

(22) Filed: Nov. 21, 2023

(65) Prior Publication Data

US 2024/0204512 A1 Jun. 20, 2024

Related U.S. Application Data

(60) Provisional application No. 63/496,847, filed on Apr. 18, 2023, provisional application No. 63/433,097, filed on Dec. 16, 2022.

(51) Int. Cl.
*H02H 9/04* (2006.01)

(52) U.S. Cl.
CPC .................................... *H02H 9/04* (2013.01)

(58) Field of Classification Search
CPC .. H02H 9/04; H02H 7/20; H02H 3/20; H02H 3/22; H02H 3/04; H02M 1/15; H02M 1/34; H02M 1/344

(Continued)

(56) References Cited

U.S. PATENT DOCUMENTS 4,321,644 A * 3/1982 Brasfield ................ H02H 9/041
327/461
5,814,954 A * 9/1998 Suzuki ...................... H02P 3/22
307/68

(Continued)

FOREIGN PATENT DOCUMENTS

CN 203826 U 9/2014
DE 102018211625 A1 1/2020

(Continued)

OTHER PUBLICATIONS

European Search Report dated Apr. 23, 2024 for corresponding European Patent Application No. 23216142.2.

*Primary Examiner* — Danny Nguyen
(74) *Attorney, Agent, or Firm* — K&L Gates LLP

(57) ABSTRACT

A power control system may include a snubber assembly conductively coupled with power sources and loads between the power sources and loads. A clipper assembly is conductively coupled with the power sources and loads between the power sources and loads. A controller can activate the clipper assembly responsive to detection of a voltage transient conducted from the one or more power sources. The controller can activate the clipper assembly to dissipate at least part of the voltage transient and to direct a remainder of the voltage transient to a ground reference responsive to the voltage transient exceeding a designated threshold. The snubber assembly may dissipate at least part of the voltage transient and direct a remainder of the voltage transient to the ground reference responsive to the voltage transient not exceeding the designated threshold.

20 Claims, 8 Drawing Sheets

100

(58) Field of Classification Search
USPC ......................................................... 361/91.7
See application file for complete search history.

(56) References Cited

U.S. PATENT DOCUMENTS

| | | | | | |
|---|---|---|---|---|---|
| 6,078,156 | A | * | 6/2000 | Spurr ......................... | H02P 3/08 |
| | | | | | 318/368 |
| 6,226,162 | B1 | * | 5/2001 | Kladar ................... | H02H 9/041 |
| | | | | | 361/111 |
| 2017/0047733 | A1 | * | 2/2017 | Buchanan .............. | H02H 9/041 |
| 2019/0149063 | A1 | * | 5/2019 | Onda ......................... | B60L 3/12 |
| | | | | | 361/30 |
| 2020/0382025 | A1 | * | 12/2020 | Chou ...................... | H02M 1/32 |
| 2020/0395867 | A1 | | 12/2020 | Horiguchi et al. | |
| 2024/0036078 | A1 | | 2/2024 | Aurand et al. | |

FOREIGN PATENT DOCUMENTS

| | | | |
|---|---|---|---|
| GB | 750695 | A | 6/1956 |
| WO | 2020011458 | A1 | 1/2020 |
| WO | 2022002800 | A1 | 1/2022 |

* cited by examiner

900

Conduct voltage from power source(s) to load(s) ⌐902

Voltage transient occurs ⌐904

Is the voltage transient large? ⌐906

YES

NO

Eliminate or reduce transient voltage via snubber assembly ⌐908

Activate clipper assembly ⌐910

Does temperature exceed threshold? ⌐912

NO

YES

Disconnect power source(s) ⌐914

POWER CONTROL SYSTEM

CROSS-REFERENCE TO RELATED APPLICATIONS

The application claims priority to U.S. Provisional Application No. 63/433,097, filed on 16 Dec. 2022 and U.S. Provisional Application No. 63/496,847, filed on 18 Apr. 2023. The entirety of these applications are incorporated herein by reference.

BACKGROUND

Technical Field

The subject matter described herein relates to systems and methods that control operations of circuits that supply of electric power to loads from power sources.

Discussion of Art

Various powered systems include components that may be electrically powered. For example, some vehicles or multi-vehicle systems includes loads such as traction motors that operate to propel the vehicles or vehicle systems. These loads may be powered by electric power sources, such as battery cells, battery banks, alternators, generators, etc. The circuitry that conducts electric current or potential to the loads may include components designed to reduce ripple currents and/or keep the circuitry between the power sources and the loads centered with respect to a ground reference. This circuitry can include direct current (DC) positive links and DC negative links. The ground reference may be a vehicle chassis. Capacitors, inductive reactors, or the like, may be used to keep the positive potential conducted on the DC positive link the same magnitude as the negative potential conducted on the DC negative link.

Stray inductances can negatively impact operation of the components. These stray inductances may be inductances of cables, other conductive components, the vehicle chassis, traction motor frames, etc. The useful life, number of remaining charging cycles, and/or charging capacity of batteries may be reduced when the potential between the batteries and the ground reference exceeds a safe operating limit or designated threshold for longer periods of time.

Additionally, the loads powered by the electric power sources may be lower voltage systems or higher voltage system that may power industrial equipment. This industrial equipment may include traction motors for heavy vehicles like locomotives and off-highway mining vehicles. The lower voltage systems may need to limit the voltage to the ground reference to avoid damaging relatively more sensitive lower voltage loads and/or sources, especially during transient events or failure modes.

The stray inductances and/or stray capacitances can increase the potential between the batteries and the ground reference. This can reduce operation of the batteries. The operation that may be reduced can include the useful life, number of remaining charging cycles, and/or the charging capacity.

It may be desirable to have a system and method that differs from those that are currently available.

BRIEF DESCRIPTION

In one embodiment, a power control system may include an inverter that may be coupled with a power source and receive an electric potential from the power source. The inverter may convert the electric potential into an alternating current supplied to a load via a conductive pathway. Positive and negative links may be connected with the inverter and may be connected with the power source to conduct the electric potential from the power source to the inverter. A first leg may conductively couple the positive and negative links. The first leg may include resistors disposed in series with each other and connected with a ground reference. A second leg may conductively couple the positive and negative links. The second leg may include capacitors disposed in series with each other and connected with the ground reference. The resistors and capacitors may be disposed in parallel with capacitances and resistances of the load and the conductive pathway coupling the inverter with the load. The resistors and the capacitors may reduce an impedance to the ground reference compared with the positive and negative links with the first leg but without the second leg.

In another embodiment, a power control system may include an inverter that may be coupled with a battery and receive electric potential from the battery. The inverter may convert the electric potential into alternating current (AC) supplied to a traction motor via one or more cables. Positive and negative DC links may be connected with the inverter and may be connected with the battery to conduct the electric potential from the battery to the inverter. A first leg may conductively couple the positive and negative DC links. The first leg may include grounding resistors disposed in series with each other and connected with a vehicle ground reference. A second leg may conductively couple the positive and negative links. The second leg may include capacitors disposed in series with each other and connected with the vehicle ground reference. The resistors and capacitors may be disposed in parallel with stray capacitances and stray resistances of the traction motor and of the one or more cables. The grounding resistors and the capacitors may reduce an impedance to the vehicle ground reference compared with the positive and negative links with the first leg but without the second leg.

In another embodiment, a power control system may include an inverter that may be coupled with a power source and receive electric potential from the power source. The inverter may convert the electric potential into an AC supplied to a load via one or more cables. A circuit may include positive and negative DC links connected with the inverter and may be connected with the power source to conduct the electric potential from the power source to the inverter. The circuit may include a first leg conductively coupling the positive and negative DC link. The first let may include grounding resistors disposed in series with each other and connected with a vehicle ground reference. The circuit may include a second leg conductively coupling the positive and negative links. The second leg may include capacitors disposed in series with each other and connected with the vehicle ground reference. The load and the one or more cables may introduce stray capacitance and stray resistance into the circuit connecting the inverter with the power source. The resistors and the capacitors may be disposed in parallel with the stray capacitances and the stray resistance of the load and of the one or more cables. The grounding resistors and the capacitors may reduce an impedance to the vehicle ground reference compared with the positive and negative DC links with the first leg but without the second leg.

In another embodiment, a power control system may include a snubber assembly that can be conductively coupled with one or more power sources and one or more loads in a location between the one or more power sources and the one or more loads. The power control system also may include a clipper assembly that can be conductively coupled with the one or more power sources and the one or more loads in the location between the one or more power sources and the one or more loads. The power control system may include a controller that can activate the clipper assembly responsive to detection of a voltage transient conducted from the one or more power sources. The controller can activate the clipper assembly to dissipate at least part of the voltage transient and to direct a remainder of the voltage transient to a ground reference responsive to the voltage transient exceeding a designated threshold. The snubber assembly may dissipate at least part of the voltage transient and direct a remainder of the voltage transient to the ground reference responsive to the voltage transient not exceeding the designated threshold.

In another embodiment, a power control system may include a controller that can monitor voltage transients in a circuit of a powered system having one or more loads powered by one or more power sources. The controller can determine whether one or more of the voltage transients exceeds a threshold and, responsive to the one or more of the voltage transients exceeding the threshold, the controller may activate a clipper assembly configured to be conductively coupled with the one or more power sources and the one or more loads in the location between the one or more power sources and the one or more loads to dissipate at least part of the one or more of the voltage transients that exceed the threshold and to direct a remainder of the one or more of the voltage transients that exceed the threshold to a ground reference. The power control system also may include a snubber assembly that can dissipate at least part of the voltage transients that do not exceed the threshold and to direct a remainder of the voltage transients that do not exceed the threshold to the ground reference.

In another embodiment, a method may include deciding whether a voltage transient in a circuit of a vehicle exceeds a designated threshold, deciding whether the voltage transient in the circuit of the vehicle is a positive voltage transient or a negative voltage transient, activating a negative clipper assembly to reduce the voltage transient responsive to deciding that the voltage transient exceeds the threshold and is the negative voltage transient, activating a positive clipper assembly to reduce the voltage transient responsive to deciding that the voltage transient exceeds the threshold and is not the negative voltage transient, and dissipating at least part of the voltage transient via a snubber assembly responsive to deciding that the voltage transient does not exceed the threshold.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to power control systems and methods that can control operation of circuits within powered systems. These systems can control or limit magnitudes of voltage to ground in the circuit. This may be used during transient events and/or as caused by failure modes.

Optionally, these systems can control conduction of electric energy from power sources to loads in powered systems while keeping differences in potential between the power sources and a ground reference below a designated difference threshold for longer than a designated time period during operation of the powered systems. The difference threshold and the designated time period may be set to have values that prevent the power sources from being damaged or operation of the power sources deteriorating over time. For example, the useful life, the number of remaining charging cycles, the charging or storage capacity, etc., of the power sources may not decrease or decrease as rapidly for power sources used in connection with the power control systems described herein.

Figure 1:
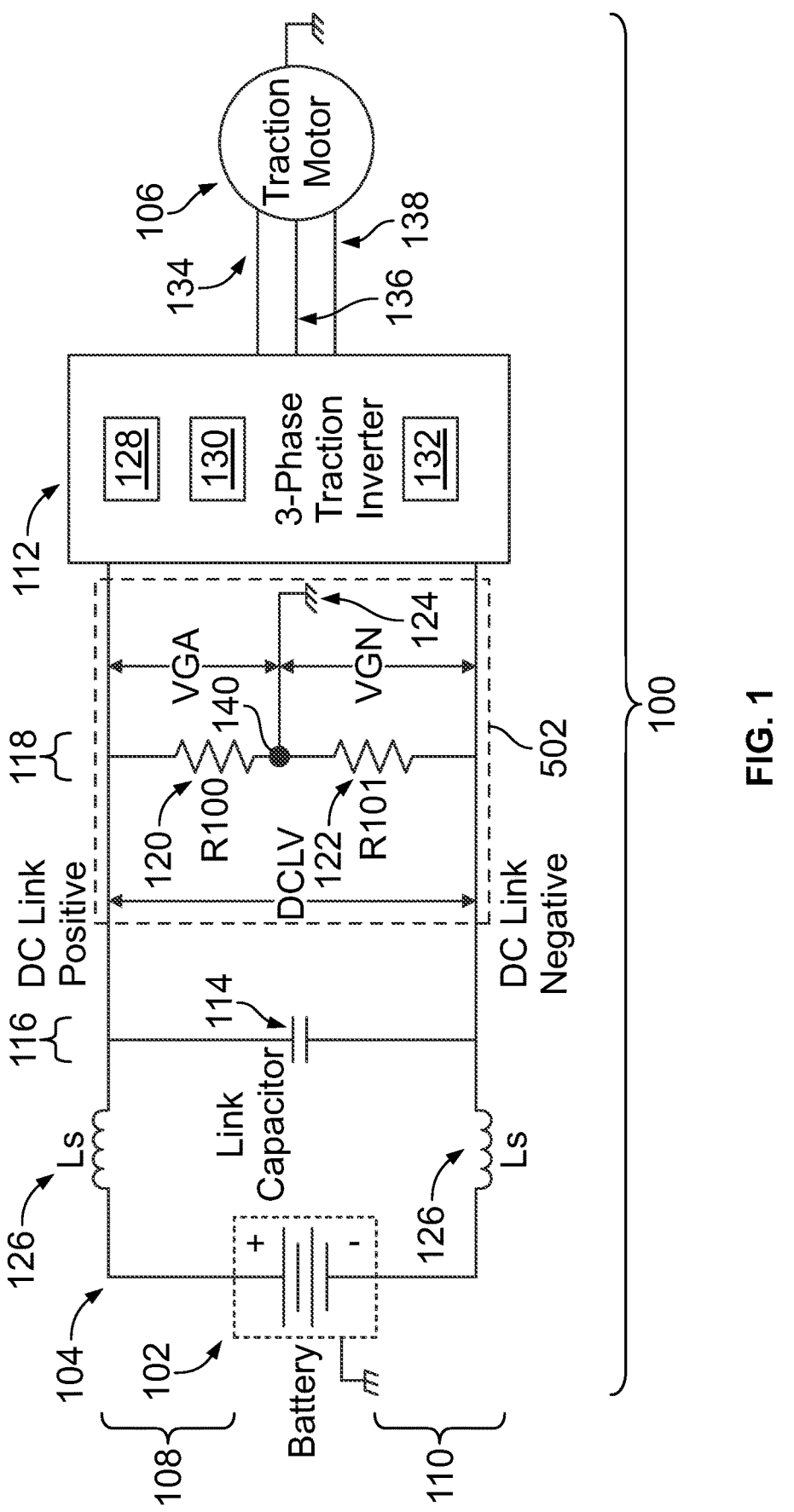
FIG. 1 illustrates one example of a power control system.

FIG. 1 illustrates one example of a power control system 100. The power control system shown in FIG. 1 may include one or more power sources 102. Suitable power sources may include one or more of batteries, battery cells, battery banks, fuel cells, capacitors, and the like. The power control system may include conductive pathways 104 that form a circuit. Suitable conductive circuitry may be formed by conductive busses, cables, wires, or the like, that conductively couple the power source with one or more loads 106, with one or more components of the power control system connected with the conductive pathways between the power source(s) and the load(s). A suitable bus may be a laminated busbar. While only a single power source and a single load are shown, the power control system may include more than one power source and more than one load. The load is shown as a three-phase, AC traction motor, but in other embodiments there may be a different load or may be another type of traction motor. In one or more examples, the load may represent a traction motor of a vehicle or vehicle system that represents a powered system. The vehicle system may be a single vehicle system or a multi-vehicle system.

With regard to the vehicles, suitable vehicles may be selected from a rail vehicle, a mining vehicle, semi-tractor trailer, agricultural equipment, or the like. Alternatively, the vehicle may be a lighter vehicle requiring less voltage to power motors, such as an automobile, a truck, or the like. In another example, the powered system may be a stationary system that powers the loads. The power sources can represent battery cells, battery stacks, battery modules, fuel cells, supercapacitors, or the like. Suitable fuel cells may include a solid oxide fuel cell (SOFC), a proton exchange membrane (PEM) fuel cell, an alkaline fuel cell, direct methanol, fuel cell, molten carbonate fuel cell, and an acid fuel cell. Suitable acid fuel cells may include solid acid and phosphoric acid fuel cells. Examples of suitable fuel cell electrodes may include a catalyst containing platinum and ruthenium; or a catalyst containing titanium tungsten oxide nanoparticles that are coated with a layer of platinum. A suitable polymer membrane may be Nafion, which is commercially available from Du Pont, or expanded porous polytetrafluoroethylene (ePTFE).

The conductive pathways include a DC positive link pathway 108 (also referred to as a positive DC link or DC link positive) and a DC negative link pathway 110 (also referred to as a negative DC link or DC link negative) disposed in parallel with each other between the power source and the load. A DC link voltage or potential ("DCLV" in FIG. 1) can represent the difference in voltage or potential between the DC positive link and the DC negative link. The DC link pathways are connected with the load by an inverter 112. Suitable inverters may include a three phase traction inverter, that inverts the DC potential conducted in these pathways into a three phase AC using switches of the inverter. The inverter may include switches 128, 130, 132 that are each connected with the load by a different conductive pathway 134, 136, 138. The switches may be or include insulated gate bipolar transistors (IGBTs) or another type of semiconductor or mechanical switch. The conductive pathways can represent cables, wires, or the like. Each switch can alternate between open and closed states to convert the DC into a different phase of AC sent to the load. Optionally, the inverter may have fewer or a greater number of switches.

A link capacitor 114 in a first leg 116 of the circuitry may be connected with the DC positive and negative links in parallel to the power source, the load, and the inverter. A second leg 118 of the circuitry may be connected with the DC positive and negative links in parallel with the first leg, the power source, the load, and the inverter, and may include plural resistors 120, 122 arranged in series with each other in the second leg. The resistor 120 may be referred to as a positive resistor as this resistor is between the positive DC link and the ground reference. The resistor 122 may be referred to as a negative resistor as this resistor is between the negative DC link and the ground reference.

A ground reference 124 may be connected with the second leg at a midpoint location 140 between these resistors. This ground reference can represent a vehicle chassis or other electrical ground of the circuit. A positive potential VGA of the circuit can represent the potential difference between the positive DC link and the ground reference (e.g., across the positive resistor) and a negative potential VGN of the circuit can represent the potential difference between the negative DC link and the ground reference. The circuit of the power control system shown in FIG. 1 also may include inductive reactors 126 in each of the positive DC link and the negative DC link between the power source and the first leg.

One or more operational parameters of the power source may be negatively impacted if the positive potential VGA or the negative potential VGN is too large for too long of a period of time. The VGN may be too large when the absolute value of the positive potential VGA or the negative potential VGN is larger than a designated potential threshold. The VGN may be too large for too long when the absolute value of the positive potential VGA or the negative potential VGN is larger than the designated potential threshold for longer than a designated time threshold. These operational parameters may include the remaining useful life, the number of remaining charging/discharging cycles or duty cycles, the charging or storage capacity, or the like. These operational parameters may be reduced if the VGA or VGN is larger than the potential threshold for longer than the time threshold.

Stray capacitances, stray inductances, and/or stray resistances may be present in the circuit represented by the power control system. These stray capacitances, inductances, and/or resistances may be capacitances, inductances, or resistances introduced or part of cables connected with the circuit, the power source, the load, the ground reference, etc.; the loads themselves; the switches in the inverter; and the like. Stray capacitances, inductances, and/or resistances may differ from non-stray capacitances, inductances, and/or resistances as the stray capacitances, inductances, and/or resistances may be unwanted, undesirable, and/or unintended capacitances, inductances, and/or resistances in a circuit. In contrast, the link capacitor, inductive reactors, and resistors shown in FIG. 1 may be non-stray capacitances, inductances, and/or resistances in that these components are wanted, desired, and intended to be included in the circuit.

Figure 2:
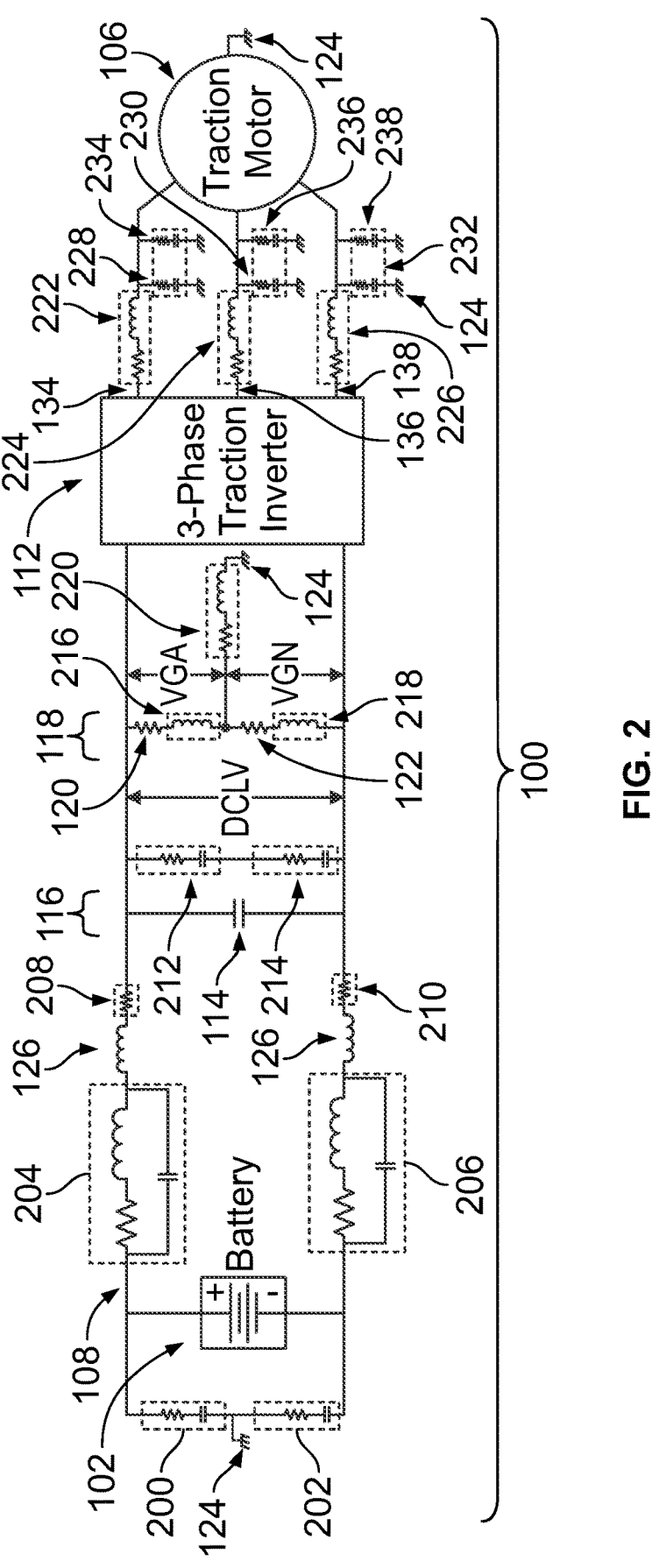
FIG. 2 illustrates another example of the power control system shown in FIG. 1 with stray parameters shown in the circuit of the power control system of FIG. 1.

FIG. 2 illustrates another example of the power control system shown in FIG. 1 with stray parameters shown in the circuit of the power control system of FIG. 1. These stray parameters can include stray capacitances, stray inductances, and/or stray resistances disposed in series and/or parallel to each other, as shown in FIG. 2. The symbol for a capacitor can represent a stray capacitance, the symbol for an inductor can represent a stray inductance, and the symbol for a resistor can represent a stray resistance.

A first and second combination 200, 202 of stray parameters each includes a stray capacitance and a stray resistance between the power source and the ground reference, such as a stray capacitance and a stray resistance in series with each other between each terminal of the battery and the vehicle chassis. A third and fourth combination 204, 206 of stray parameters can each represent a stray resistance and a stray inductance in series with each other and in parallel with a stray capacitance. The third and fourth combinations of stray parameters can represent the stray parameters internal to the batteries of the power source. Stray resistances 208, 210 in each of the positive and negative DC links may represent the stray resistances of the conductive bodies forming these DC links. Fifth and sixth combinations 212, 214 of stray parameters can each represent a stray capacitance and a stray resistance in series with each other, with each of these combinations caused by connection of terminals of the link capacitor to the DC links.

Stray inductances 216, 218 can each be disposed in the second leg of the circuit in series with the positive and negative resistances. These stray inductances can be caused by connection of the positive and negative resistances with the positive and negative DC links. Additionally, a seventh combination 220 of stray parameters can represent the stray resistance and the stray inductance of the cable or other conductive body that couples the second leg at the midpoint between the positive and negative resistors with the ground reference.

Eighth, ninth, and tenth combinations 222, 224, 226 of stray parameters can represent the stray resistance and the stray inductance in series with each other of the cables or other conductive bodies that couple each of the switches in the inverter with the load. Eleventh, twelfth, and thirteenth combinations 228, 230, 232 of stray parameters can each represent a series of a stray resistance and a stray capacitance caused by the cable or other conductive body connecting the traction motor with the ground reference. The eleventh combination can represent the stray parameters associated with or caused by the cable or conductive body coupling a first or top switch of the inverter with the load, the twelfth combination can represent the stray parameters associated with or caused by the cable or conductive body coupling a second or middle switch of the inverter with the load, and the thirteenth combination can represent the stray parameters associated with or caused by the cable or conductive body coupling a third or bottom switch of the inverter with the load. Fourteenth, fifteenth, and sixteenth combinations 234, 236, 238 of stray parameters can each represent a series of a stray resistance and a stray capacitance of the load itself.

Due to the presence of these stray parameters in the circuit, when the inverter switches are switching between open and closed states, the potential between the power source and the ground reference may increase. For example, the magnitude or absolute value of this potential may increase. The potential difference between the positive DC link and the ground reference may be different than the potential difference between the negative DC link and the ground reference. The potential difference between the positive DC link and the ground reference or the potential difference between the negative DC link and the ground reference may be greater than half of the potential difference between the positive DC link and the negative DC link.

For example, while the first or top switch of the inverter is switched on and the second or middle switch as well as the third or bottom switch of the inverter are switched off, the stray capacitances of the traction motor and of the cable connecting the switch with the traction motor may be in parallel with the positive resistor. This can cause the effective impedance between the positive DC link and the ground reference to decrease and be less than the impedance between the negative DC link and the ground reference. As a result, the ground reference may shift toward positive bus. For example, the magnitude of the potential between the positive DC link and the ground reference (i.e., VGA) may be smaller than the magnitude of the potential between the negative DC link and the ground reference (i.e., VGN). A similar response may occur while the third or bottom switch of the inverter is switched on, which can cause the ground reference to shift toward the negative DC link. This, in turn, can cause the VGN to be smaller than the VGA. This imbalance between the VGA and the VGN can reduce operation of the power source or deteriorate the power source, as described herein.

Figures 3, 4:
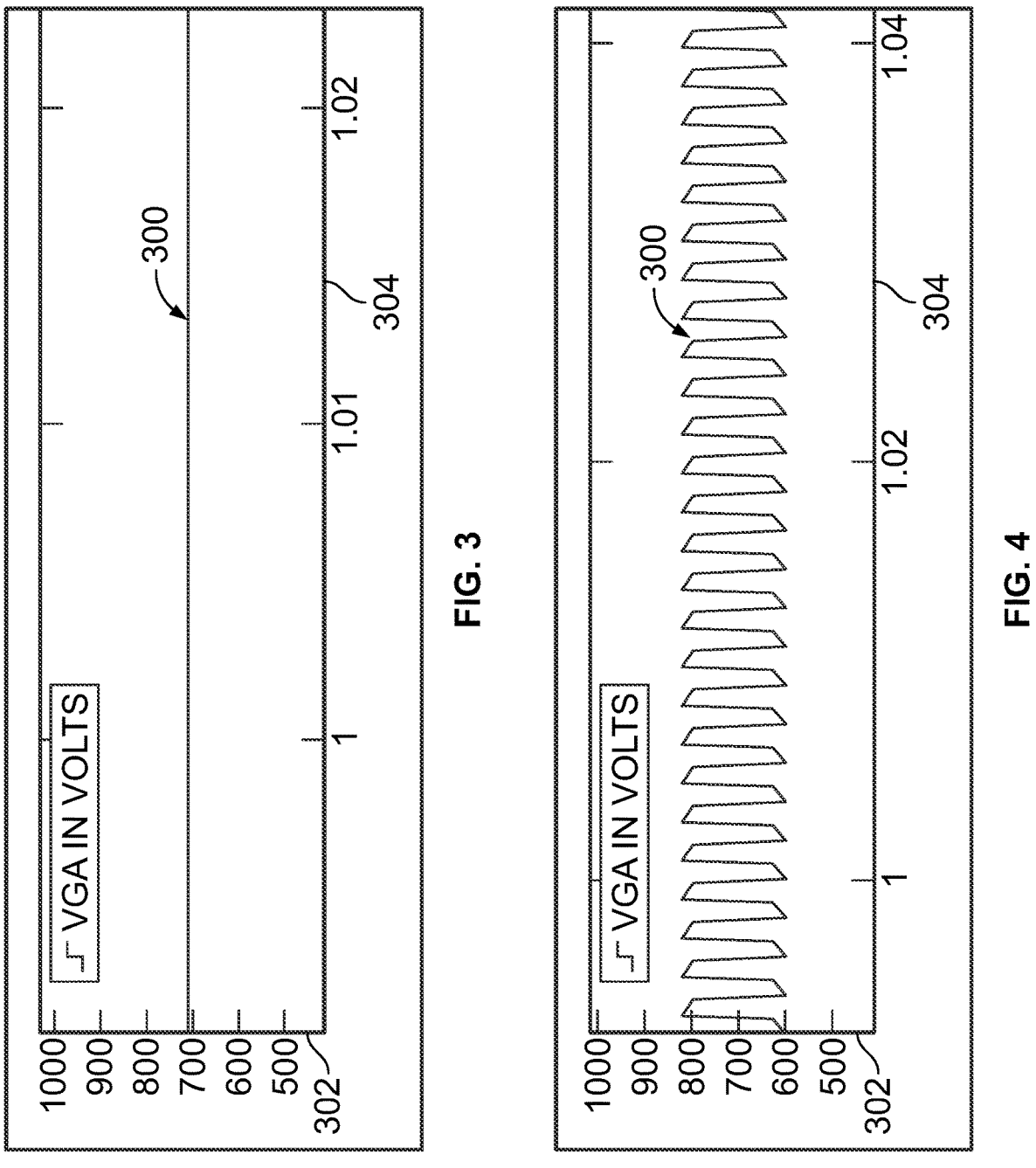
FIG. 3 illustrates one example of potential in the power control system shown in FIG. 2 with respect to time.
FIG. 4 illustrates another example of the potential in the power control system shown in FIG. 2 with respect to time.

FIG. 3 illustrates one example of VGA 300 in the power control system shown in FIG. 2 with respect to time while the inverter is not switching any of the switches on or off. FIG. 4 illustrates one example of the VGA in the power control system shown in FIG. 2 with respect to time while the switches of the inverter are switching between on and off states to convert the DC input to the inverter to AC provided to the load. The VGA is shown alongside a vertical axis 302 representative of voltage or potential and alongside a horizontal axis 304 representative of time. As shown in FIG. 3, the VGA does not change with respect to time. The VGN similarly may not change with respect to time, thereby providing balance between the VGA and the VGN in the circuit while the inverter is not switching to output AC.

But as shown in FIG. 4, while the inverter is switching to output AC, the VGA varies with respect to time. The VGA may vary significantly from the baseline value shown in FIG. 3 while the inverter is switching. The baseline value can be the unchanging or static value of the VGA in FIG. 3. This can damage or otherwise deteriorate the power source. Similar or identical behavior may be observed with respect to VGN during inverter switching versus not switching.

Figure 5:
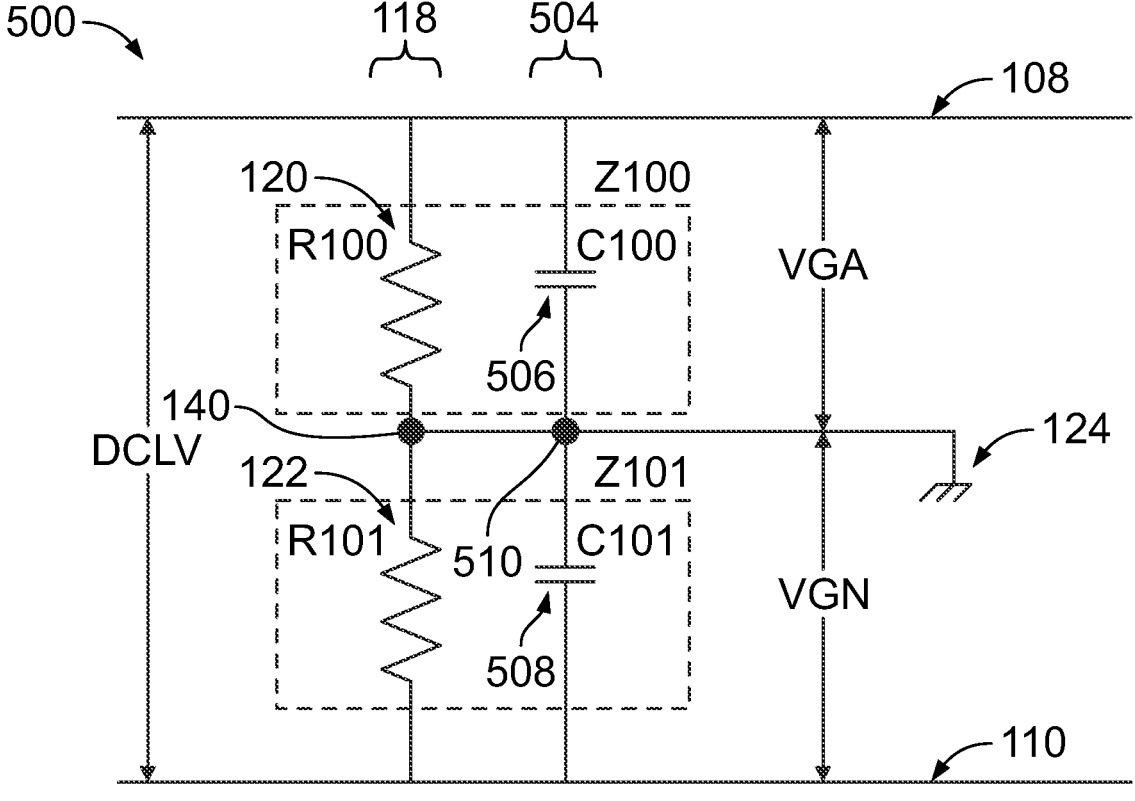
FIG. 5 illustrates one example of a modification portion to the power control system shown in FIG. 1.

FIG. 5 illustrates one example of a modification portion 500 to the circuit of the power control system shown in FIG. 1. A boxed portion 502 of the circuit shown in FIG. 1 represents the part of the circuit of the power control system that can be replaced by the modification portion shown in FIG. 5. The modification portion can change the circuit shown in FIG. 1 by adding a third leg 504 to the circuit in parallel to the power source, the DC link, the first leg, the second leg, and the inverter.

The third leg may be connected with the positive DC link and the negative DC link in locations that are between (a) the connections between the second leg and the positive and negative DC links and (b) the ground reference and the inverter. The third leg can include capacitors or capacitive elements 506, 508 connected in series with each other. A midpoint 510 of the third leg between the capacitive elements may be connected with the ground reference and with the midpoint of the second leg. Each of the capacitive elements may be disposed in parallel with one of the resistors in the second leg. The capacitive element 506 may be referred to as a positive capacitor or capacitive element and may be in parallel with the positive resistor of the second leg. The capacitive element 508 may be referred to as a negative capacitor or capacitive element and may be in parallel with the negative resistor of the second leg.

The added capacitive elements in the third leg across the resistors in the second leg may not significantly change or may not change the impedance of the connection to the ground reference while stray capacitances are created in parallel during switching of the switches in the inverter. When the top or first switch in the inverter is switched on to a state where potential is conducted through the top or first switch, the stray capacitance and stray resistances in the eleventh combination 228 and in the fourteenth combination 234 are arranged in parallel with an inductance of the combination of the positive resistor and the positive capacitor in the second and third legs. The impedance of this combination of the positive resistor and the positive capacitor may be lower or significantly lower than the impedance of the positive resistor alone. Consequently, the effective impedance between the positive DC link to the ground reference may decrease, but not decrease as much as the circuit shown in FIG. 2 that does not include the third leg.

This can cause the ground reference to shift toward the positive DC link. For example, the value of VGA may become closer to the magnitude or absolute value of VGN. Stated differently, the difference in magnitudes or absolute values of VGA and VGN may move closer together or become equivalent when compared with the circuit shown in FIG. 2. Similar behavior can occur while the bottom switch of the invert is switched on, which can cause the ground reference to shift toward the negative DC link. The magnitude or absolute value of the VGN may become closer to the value of VGA such that the difference in magnitudes or absolute values of VGA and VGN may move closer together or become equivalent when compared with the circuit shown in FIG. 2.

Figure 6:
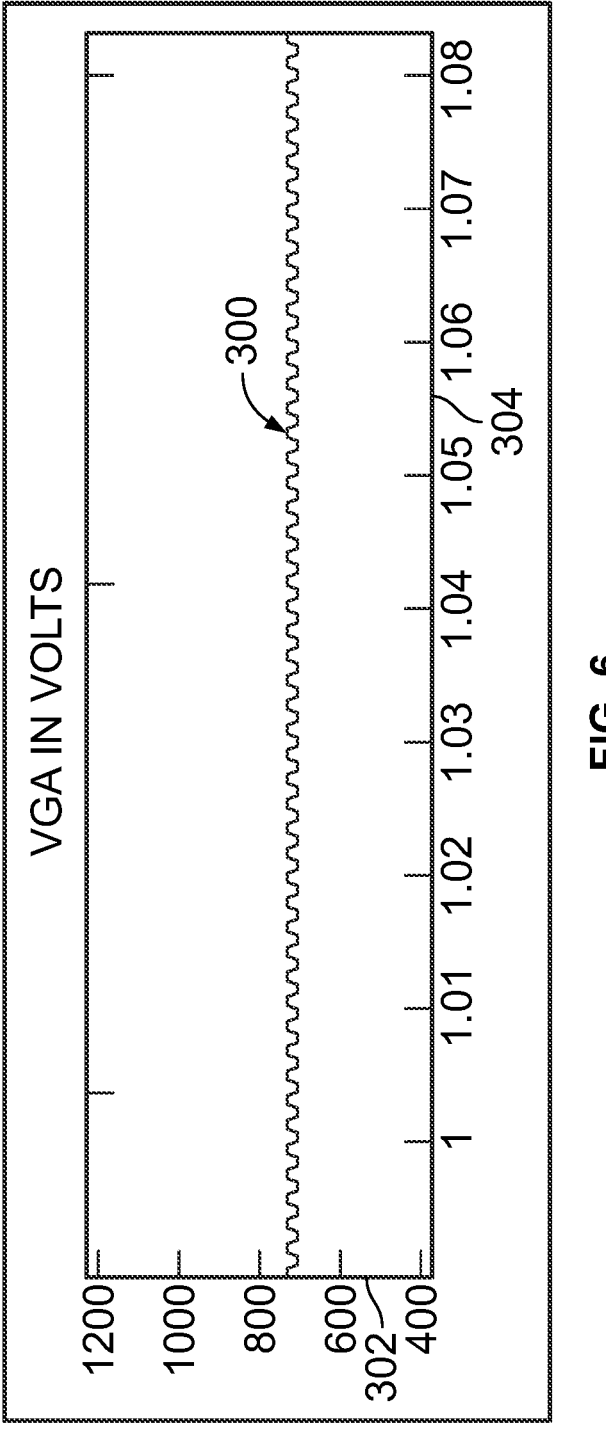
FIG. 6 illustrates another example of the potential in the power control system shown in FIG. 1.

FIG. 6 illustrates another example of the VGA in the power control system shown in FIG. 1 with but with the third leg added by the modification portion shown in FIG. 5. The VGA in the power control system is shown in FIG. 6 with respect to time while the switches of the inverter are switching between on and off states to convert the DC input to the inverter to AC provided to the load. The VGA is shown alongside the vertical axis representative of voltage or potential and alongside the horizontal axis representative of time. As shown in FIG. 3, the VGA does not change with respect to time. The VGN similarly may not change with respect to time, thereby providing balance between the VGA and the VGN in the circuit while the inverter is not switching to output AC.

As shown in FIG. 6, while the inverter is switching to output AC, the VGA varies with respect to time. In FIGS. 4 and 6, the power sources may be providing the same potential to the circuits, the inverters may be switching the same switch at the same frequency, and the like, with the only difference being the presence of the third leg with the capacitors shown in FIG. 4 impacting the VGA in FIG. 6.

In contrast to the variances in the VGA in FIG. 4 without the capacitors in the third leg of the circuit shown in FIG. 1, the capacitors in the third leg of the circuit shown in FIG. 5 can significantly reduce the size of the variances or changes in the VGA (e.g., the peak-to-peak change between the lowest or lower values of the VGA and the largest or larger values of the VGA). The capacitors in the third leg across the resistors in the second leg may not significantly change or may not change the impedance of the connection to the ground reference while stray capacitances are created in parallel during switching of the switches in the inverter. As described above, the impedance between the positive DC link to the ground reference may decrease relative to the circuit shown in FIG. 1 or 2 without the capacitors in the third leg.

This can cause the ground reference to shift toward the positive DC link and reduce the variances in VGA and/or VGN. The VGA and/or VGN may vary less significantly from the baseline value while the inverter is switching with the capacitors in the third leg. This can reduce or avoid damage, or otherwise reduce or avoid deterioration, of the power source. For example, the power source in the circuit shown in FIGS. 1 and 2 without the modification portion may have a shorter useful life, fewer charging and discharging cycles, and/or a reduced storage or charging capacity when compared with the same power source but in the circuit shown in FIG. 1 with the modification portion shown in FIG. 5. The reduced variances in the VGA and/or VGN can improve operation of the power source and/or lengthen the useful life of the power source.

In another example, a method for controlling delivery of electric power from a power source to a load is provided. This method can represent the operations performed by the power control system shown in FIGS. 1 and 5. The method can include a step of activating the power source to provide DC to positive and negative DC links. This potential is conducted through the circuit of FIG. 1 as modified by FIG. 5 to the inverter. At another step, the inverter controls switches to change the DC to an AC current. As described above, the added capacitive elements in the third leg across the resistors in the second leg may not significantly change or may not change the impedance of the connection to the ground reference while stray capacitances are created in parallel during switching of the switches in the inverter. The stray capacitance and stray resistances in the cable connected to the load and of the load itself may be arranged in parallel with the inductance of the combination of the resistor(s) and the capacitor(s) in the second and third legs. The impedance of this combination of the resistor(s) and the capacitor(s) may be lower or significantly lower than the impedance of the resistor(s) alone. Consequently, the effective impedance between the DC link(s) to the ground reference may decrease, but not decrease as much as the circuit shown in FIG. 2 that does not include the third leg. This can reduce variances in the potential in the circuit, which can damage the power source if the variances are too large and/or last too long. At another step of the method, the AC is provided to the load, and work is performed by the load (e.g., propelling a vehicle).

Figure 7:
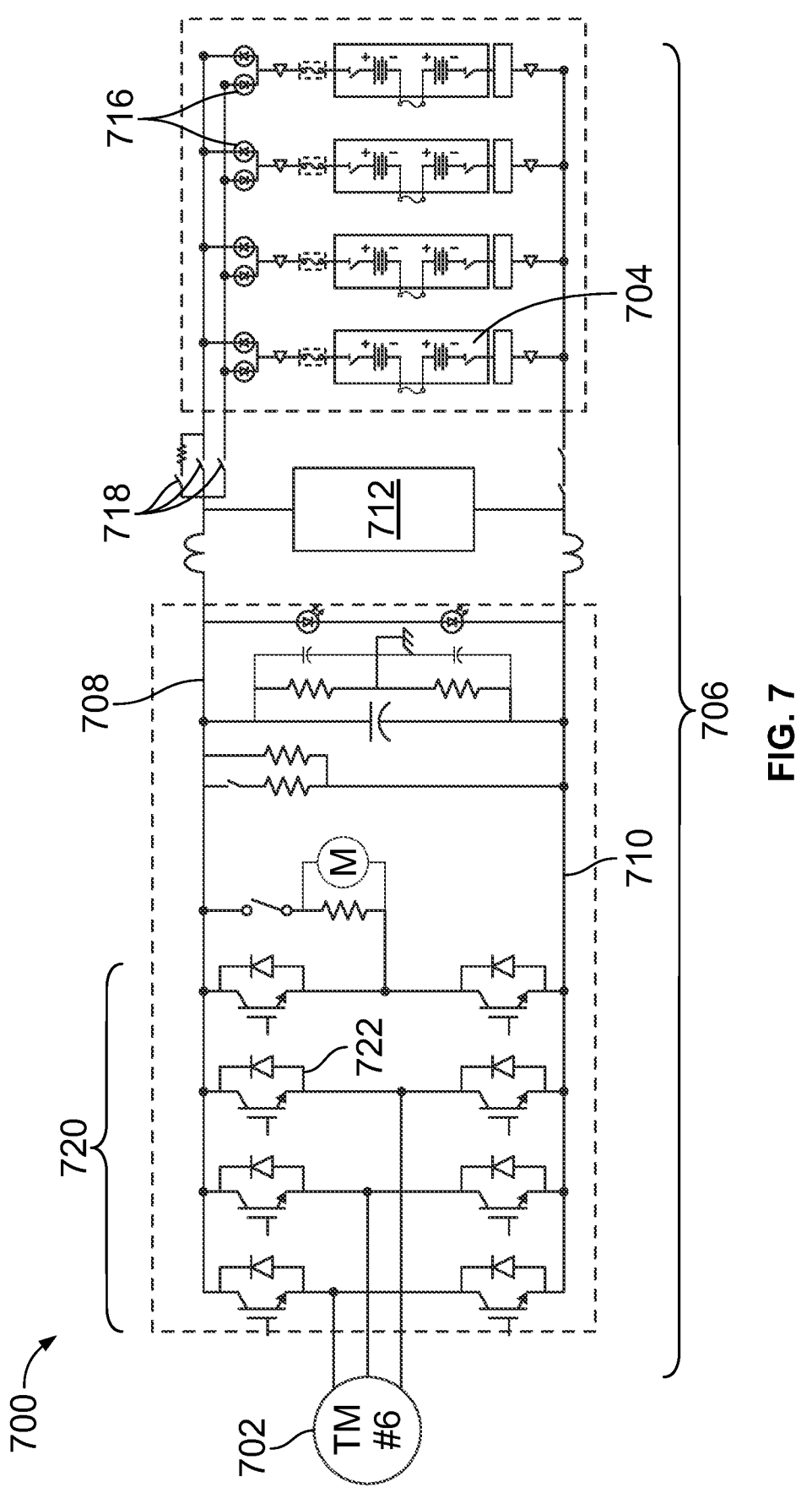
FIG. 7 illustrates another example of a powered system.

FIG. 7 illustrates another example of a powered system 700. The powered system may include one or more loads 702 that are powered by one or more power sources 704. While a single load and four power sources are shown, the powered system may include more loads or fewer power sources. In one example, the loads may be higher voltage loads that are powered with high voltages, such as voltages in excess of hundreds of volts (e.g., approximately 1,500 volts). The load shown in FIG. 7 may represent a traction motor of a vehicle or vehicle system that represents the powered system. The vehicle system may be a single vehicle system or a multi-vehicle system.

The powered system includes a powered system circuit 706 that interconnects the power sources with the loads via positive and negative DC conductive buses 708, 710 and other components described herein. A control system 712 is connected with the powered system circuit. The control system may operate to prevent transient changes in voltage conducted in the powered system circuit from damaging the power sources and/or the loads, as described herein.

Positive voltage terminals or connections of the power sources may be connected with the loads via diodes 716, switches or contactors 718, and a converter device 720 via the positive DC bus. Negative voltage terminals or connections of the power sources may be connected with the loads via the negative DC bus. As shown in FIG. 7, there may not be diodes between the power sources and the negative DC bus. Alternatively, there may be diodes between the power sources and the negative DC bus.

The converter device can represent one or more components that change the DC output by the power sources into another type of energy, such as an AC. For example, the converter device may represent an inverter having several converter switches 722 that operate to convert the DC output by the power sources into multi- or single phase AC for powering the load(s).

In operation, voltage from the power sources may be conducted through the buses of the powered system circuit to the converter device. The converter device may alternate closing and opening of the switches in the converter device to change the voltage to an AC that is supplied to the load(s) for powering the load(s). If the voltage from the power sources suddenly changes by more than a threshold rate, the transient voltage may pose an arcing risk. The voltage changes with respect to ground can damage the power sources, loads, nearby persons, etc.

The control system may operate to reduce the magnitude(s) of the voltage transients. The control system may dampen or slow the rates at which the transient voltages occur. The control system may open the contactors if the voltage transients are too large. If the control system operates for too long to dampen the voltage transients. The control system may reduce or prevent overheating of components—such as those of the control system. In one embodiment, the control system may detect when a voltage transient is occurring earlier than one or more other known systems. In one embodiment, the control system may predict when a voltage transient is about to occur allowing the control system or an operator to take predictive actions, such as to shunt, stop or dampen the voltage transient. This may avoid or reduce damage to components of the powered system circuit.

Figure 8:
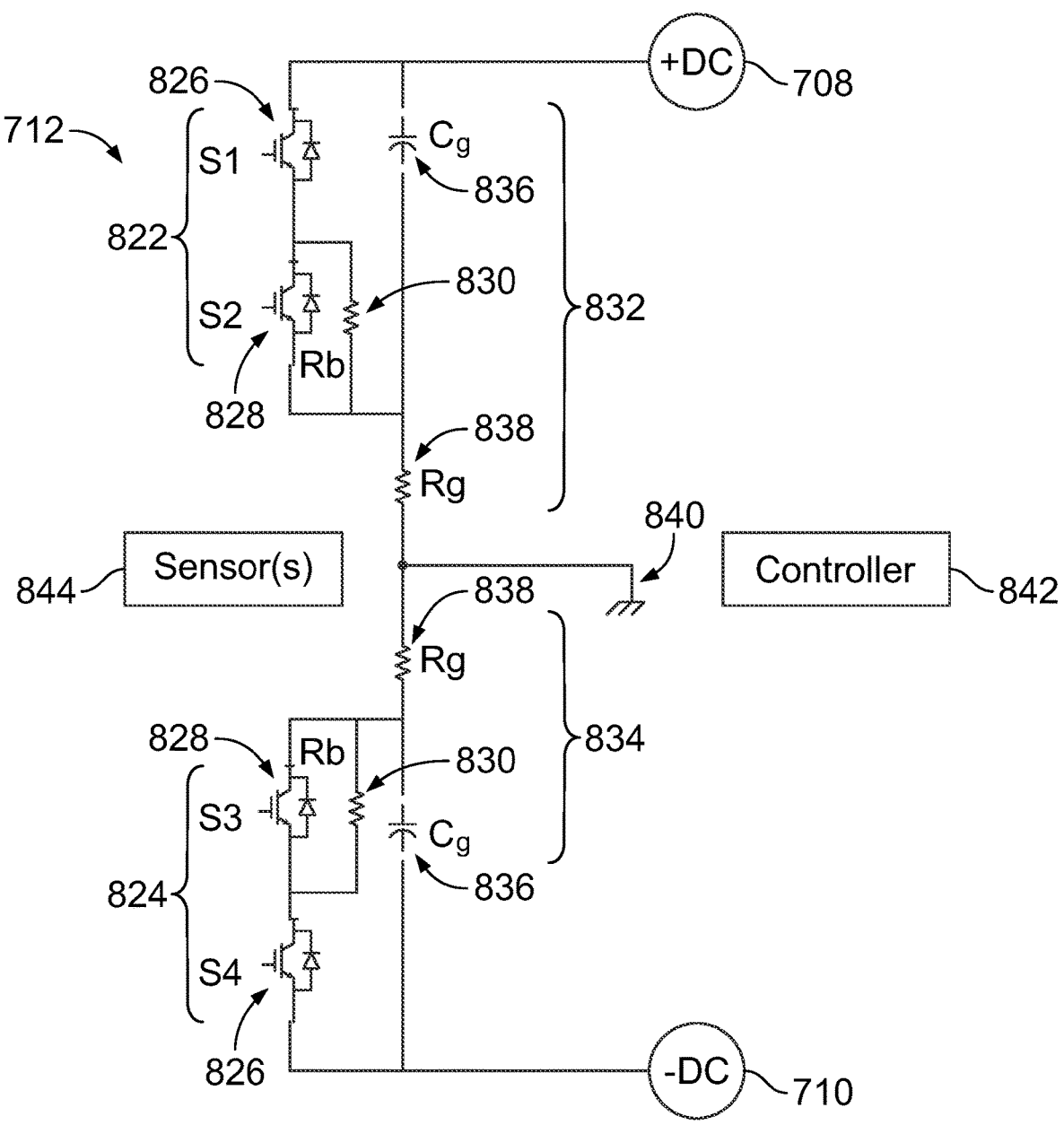
FIG. 8 illustrates one example of the control system shown in FIG. 7.

With continued reference to the powered system circuit shown in FIG. 7, FIG. 8 illustrates one example of the control system shown in FIG. 7. The control system may include several components conductively coupled with each other and with the positive DC bus and the negative DC bus on the powered system circuit, as shown in FIG. 8. The control system can be connected with the positive DC bus of the powered system between the powered system switches or contactors 718 and the converter device. The control system can be connected with the negative DC bus of the powered system between the power sources and the converter device. Optionally, the control system may be connected with the positive DC bus and/or the negative DC bus in other locations.

The control system can include a positive clipper assembly 822 and a negative clipper assembly 824. The positive clipper assembly is conductively coupled with the positive DC bus and the negative clipper assembly is conductively coupled with the negative DC bus. Each of the clipper assemblies includes switches 826, 828 disposed in series with each other and a clipper resistor 830 disposed parallel to the switch 828, as shown in FIG. 8. This clipper resistor may not be parallel to the other switch 826 in the clipper assembly. The clipper resistor may represent several resistors disposed in series or parallel to each other. The switch 826 that is not parallel to the clipper resistor can be referred to as the activation switch and the switch 828 that is parallel to the clipper resistor can be referred to as the parallel switch. Suitable clippers may include one or more diode clippers, Zener diode clippers, Op-amp precision clippers. Other suitable clippers may be series clippers and/or shunt clippers. Clipper type and features may be selected with reference to end use requirements. Suitable clipper alternatives may include a clamper circuit in some embodiments. In some embodiments, the clippers may be selected for use with analog waveforms, while in other embodiments clippers may be selected for use with digital waveforms. The clipper may be selected as a biased clipper in one embodiment, and an unbiased clipper in another embodiment.

The control system may include a positive snubber assembly 832 and a negative snubber assembly 834. The positive snubber assembly is conductively coupled with the positive DC bus and the negative snubber assembly is conductively coupled with the negative DC bus. Each of the snubber assemblies includes a capacitor 836 disposed in series with a grounding resistor 838. As shown, the grounding resistors of the snubber assemblies may be different resistors than the clipper resistors of the clipper assemblies. The positive clipper assembly may be parallel to the capacitor of the positive snubber assembly but in series with the grounding resistor of the positive snubber assembly. The negative clipper assembly may be parallel to the capacitor of the negative snubber assembly but in series with the grounding resistor of the negative snubber assembly. Suitable snubbers may be selected from resistor/capacitor RC snubbers, rectifier/diode RD snubbers, and varistor V snubbers. Snubber types may be selected with reference to end use requirements.

The snubber and clipper assemblies may be connected with a ground reference 840. This ground reference may be a vehicle chassis, a ground earth reference, or the like. The connection to the ground reference may be between the clipper and snubber assemblies with the positive clipper and snubber assemblies on one side of the ground reference and the negative clipper and snubber assemblies on the other side of the ground reference. The resistors of the snubber assemblies may be between the clipper assemblies and the ground reference. Optionally, the snubber assemblies may include, use, or share the same grounding resistor. For example, the same grounding resistor may be between the capacitors of the snubber assemblies and the ground reference.

The control system may include a controller 842 that represents hardware circuitry that includes and/or is connected with one or more processors (e.g., microprocessors, field programmable gate arrays, integrated circuits, etc.) that perform the operations described herein. The controller may be embodied in a single device disposed in a single location, or may represent multiple devices disposed in different locations that work together to perform the functions of the controller. The controller may control operation of the switches of the clipper assemblies, such as by opening or closing these switches as described herein. The control system may include one or more sensors 844 that measure, sense, or detect characteristics of the powered system or the control system. For example, the sensors may include a temperature sensor that measures the temperature of the grounding resistors as described herein.

In operation, the power sources supply voltage to the converter device, which changes the voltage into AC that is supplied to the load(s) to perform work. The circuit of the powered system may experience a transient voltage event whereby the voltage output by the power sources onto the positive and/or negative DC buses of the powered system suddenly increase. For example, instead of the power sources supplying a steady amount of voltage to the bus, the positive or negative potential on the positive or negative bus may suddenly increase due to faults in the circuit or power sources, external factors or an electronic charge from an outside source, opening or closing of switches, faulty contacts, or the like. Other contemplated sources of transient voltage changes include the coupling/decoupling of other powered circuits, phase shifting of current resulting in harmonics, electromagnetic pulses, and the like. One coupling/decoupling event may result from a catenary/pantograph operation. The pantograph may transition from one catenary to another, there may be debris on the catenary line, the vehicle may shift relative to the catenary faster than the pantograph can adjust, and the like. In one embodiment, electrically coupled loads start up or stop while coupled to the system. Lightning strikes may cause current and voltage surges in an energized system. And normal operation of electrically coupled equipment can cause transient voltage differentials—more so for emergency type operations, such as sudden acceleration or deceleration of a vehicle can cause large demands on the electrical propulsion systems.

The transient voltages may occur over or during relatively short time periods (e.g., one millisecond or the like), and can involve the voltage increasing during this time period to unwanted magnitudes or levels. If left unmitigated, these transient events have the potential to damage components of the powered system, can pose a safety risk to nearby persons, or the like. During operation, each of the snubber assemblies can absorb transient changes in the voltage by directing the extra voltage conducted on the positive or negative bus to the ground reference. The capacitor of the snubber assembly can be charged with at least some of the excess voltage, and the combination of the capacitor and the grounding resistor of the snubber assembly can form a resonant circuit that dampens or slows the rate of increase due to the transient event. For example, the excess voltage may resonate between the capacitor and the grounding resistor with the capacitor absorbing at least some of the voltage while a remainder of the voltage may be conducted through the grounding resistor to the ground reference. The voltage that charges the capacitor also may be conducted to the grounding resistor and at least partially dissipated as heat and then to the ground reference. The capacitor and grounding resistor of the positive snubber assembly can slow or stop the sudden increase of the positive voltage on the positive DC bus in this manner. Similarly, the capacitor and grounding resistor of the negative snubber assembly can slow or stop the sudden increase of the negative voltage on the negative DC bus in this manner. This can prevent the sudden increases in voltage from reaching the loads or power sources.

The snubber assemblies can prevent smaller or shorter transient voltages from reaching the loads and/or power sources. For larger or longer transient voltages, the controller can use at least one of the clipper assemblies to cut off the increased voltages from reaching the loads and/or power sources. For example, if the transient voltage is an increase or decrease in the voltage of no greater than a threshold voltage over shorter than a designated period of time, then the corresponding snubber assembly can absorb the excess voltage and dampen the change in voltage on the corresponding positive or negative DC bus to protect the components of the circuit of the powered system. If the transient voltage is an increase or decrease in the voltage of at least the threshold voltage over shorter than the designated period of time, then the corresponding clipper assembly can absorb the excess voltage and dampen the change in voltage on the corresponding positive or negative DC bus to protect the components of the circuit of the powered system. The threshold voltage and/or designated period of time can vary or be set by an operator or the controller. In one example, the threshold voltage is seven hundred twenty-five volts, and the designated period of time can be one millisecond. Alternatively, the threshold voltage and/or the designated period of time may change, such as increasing the threshold voltage for higher power systems or decreasing the threshold voltage for lower power systems.

In the event that the transient voltage is large, then the controller can turn on or activate the corresponding clipper assembly. For example, if the transient voltage exceeds the determined threshold voltage and/or exceeds the threshold voltage for longer than a threshold time, the controller can activate the clipper assembly. If there is a large positive transient voltage on the positive DC bus, the controller can close the activation switch in the positive clipper assembly. Optionally, the controller can open the parallel switch in the positive clipper assembly. In one embodiment, the controller does not close the activation switch in the negative clipper assembly while the activation switch in the positive clipper assembly is closed. This can prevent overheating or damage to one or more of the clipper resistors of the positive and/or negative clipper assembly.

The larger positive transient voltage can then be conducted through the closed activation switch in the positive clipper assembly to the clipper resistor. The clipper resistor can dissipate at least some of the larger positive transient voltage as heat. A remainder of the larger positive transient voltage can be conducted through the grounding resistor, at least partially dissipated as heat, and conducted to the ground reference. The controller can alternate the state of the activation switch in the positive clipper assembly by alternating the activation switch between a closed state where the activation switch conducts the larger positive transient voltage and an open state where the activation switch does not conduct the larger positive transient voltage to control the onrush of the larger positive voltage into the clipper and grounding resistors. Otherwise, one or more of these resistors may overheat or otherwise become damaged.

With respect to larger negative transient voltages, if there is a large negative transient voltage on the negative DC bus, the controller can close the activation switch in the negative clipper assembly. Optionally, the controller can open the parallel switch in the negative clipper assembly. The controller may not close the activation switch in the positive clipper assembly while the activation switch in the negative clipper assembly is closed, as described above.

The larger negative transient voltage can then be conducted through the closed activation switch in the negative clipper assembly to the clipper resistor. The clipper resistor can dissipate at least some of the larger negative transient voltage as heat. A remainder of the larger negative transient voltage can be conducted through the grounding resistor, at least partially dissipated as heat, and conducted to the ground reference. The controller can alternate the state of the activation switch in the negative clipper assembly by alternating the activation switch between the closed state and the open state to control the onrush of the larger negative voltage into the clipper and grounding resistors, as described above.

In the clipper assemblies, the parallel switch may be closed by the controller while the clipper assembly is not activated and the parallel switch may be opened by the controller while the clipper assembly is activated.

The controller may monitor temperatures of one or more of the resistors to decide whether to change how the control system operates based on the temperatures. The controller or control system may operate thermal management equipment responsively or proactively in some embodiments. This can help reduce or avoid damage to the control system. For example, the sensor(s) may measure the temperature of the clipper resistors of the clipper assemblies and/or the grounding resistors of the snubber assemblies. The sensor(s) can communicate the measured temperature(s) to the controller. If the measured temperature(s) exceed a temperature threshold, are increasing at a rate that exceeds a threshold heating rate, or are just increasing, then the controller can deactivate the corresponding clipper assembly or slow the frequency at which the clipper switch alternates between closed and open states. For example, if the temperature of the positive clipper resistor or the positive grounding resistor exceeds the threshold temperature or is rising at a rate that is faster than the threshold heating rate, then the controller may open the activation switch of the positive clipper resistor to deactivate the positive clipper assembly. Optionally, the controller may lengthen the period of times that the activation switch of the positive clipper resistor is open during the repeated cycling of the activation switch. These steps can give the clipper resistor time to cool and avoid damage to the clipper resistor. The controller can similarly monitor temperatures of the clipper resistor in the negative clipper assembly and deactivate or open the activation switch in the negative clipper assembly. If the temperatures of the resistor(s) continue to increase, then the controller can disconnect the power sources from the rest of the circuit of the powered system by opening the contactors to protect the components of the powered system and/or nearby persons. Alternatively, if the temperature of the clipper resistor is decreasing or not increasing, the controller can increase or speed up the switching frequency at which the clipper assembly having that clipper resistor alternates between open and closed states.

In one embodiment, the controller may only activate one of the positive or negative clipper assemblies at a time, as described above. The controller may prioritize activating the negative clipper assembly above or ahead of the positive clipper assembly. For example, the controller may detect voltage transients on both the positive and negative DC buses. But the controller may activate the negative clipper assembly before or instead of the positive clipper assembly to reduce the negative voltage transient first. The controller may then activate the positive clipper assembly after the negative voltage transient has been resolved or eliminated. The controller may prioritize the negative clipper assembly ahead of the positive clipper assembly due to the protection to the power sources provided by the diodes between the power sources and the positive DC bus.

Optionally, the controller can detect a transient positive or negative voltage or an increasing trend of transient voltages by monitoring the temperatures measured by the sensor(s). For example, as transient voltages occur, the grounding resistor(s) may heat up to dissipate the transient voltage conducted through the snubber assembly or assemblies. The controller can examine the temperatures measured by the sensor(s) over time and determine whether the temperatures of the grounding resistors are elevated often, which can indicate a potential or upcoming fault or failure of the power sources, of insulation of the power sources, etc. The temperatures of the grounding resistors may be elevated often when the measured temperatures exceed a temperature threshold more often than a threshold frequency. The controller can then forecast the fault or failure and open one or more of the contactors to deactivate or disconnect the power sources to protect the components of the powered system and/or nearby persons.

Figure 9:
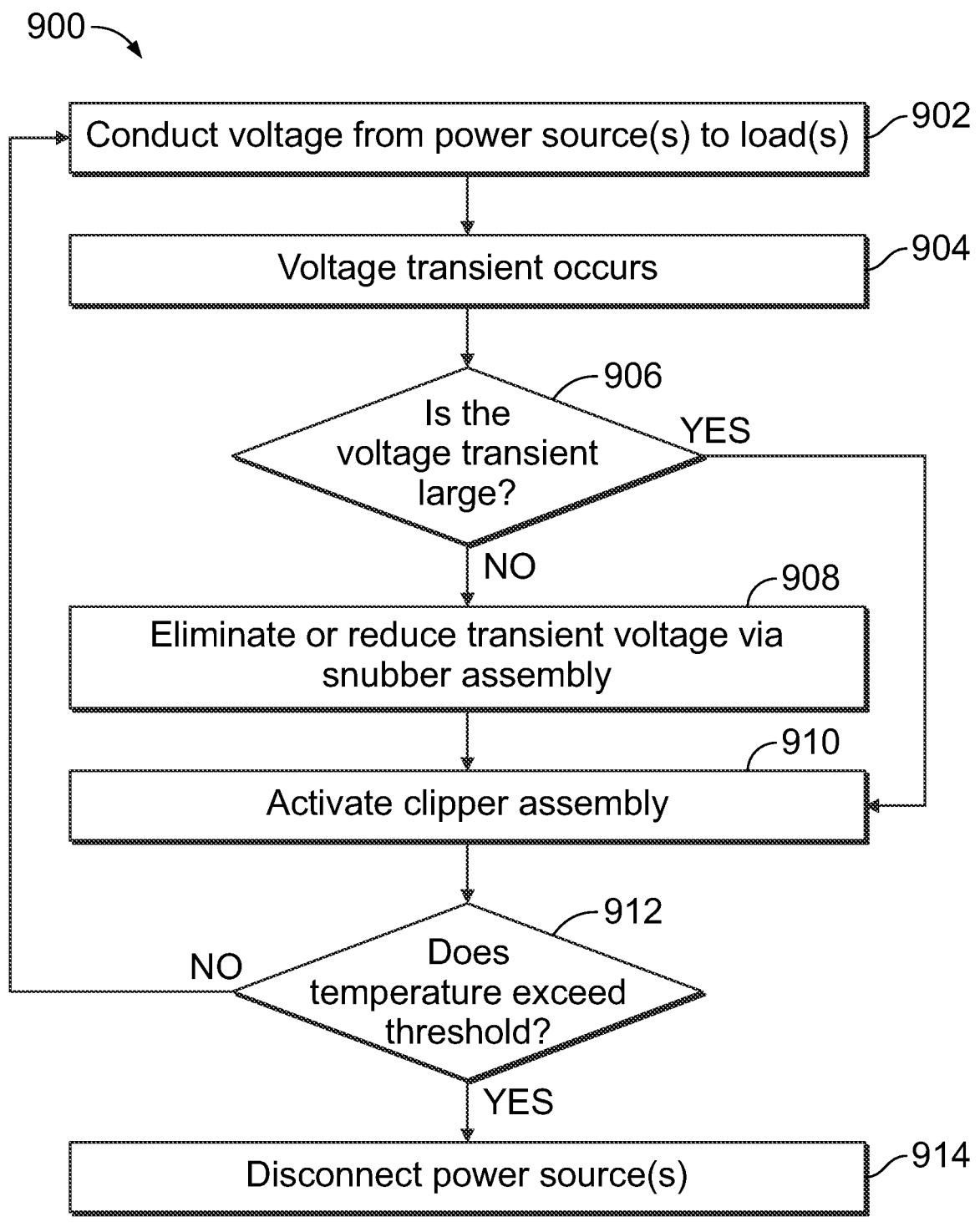
FIG. 9 illustrates a flowchart of one example of a method for controlling a power supply circuit of a powered system.

FIG. 9 illustrates a flowchart of one example of a method 900 for controlling a power supply circuit of a powered system. The method can represent operations performed by the control system described herein. At step 902, voltage is conducted from the power sources to the load(s) via the circuit. At step 904, a voltage transient occurs. At step 906, a decision is made as to whether the magnitude of the voltage transient exceeds a threshold. For example, if the controller determines that the increase in positive voltage or the decrease in negative voltage in the transient exceeds a threshold, then the controller decides that the transient is a larger transient and flow of the method may proceed toward step 910. Otherwise, flow of the method can proceed toward step 908.

At step 908, at least part of the transient voltage is conducted into a snubber assembly (e.g., the positive or negative snubber assembly depending on whether the transient is a positive or negative voltage, as described above). As described above, the snubber assembly can dissipate and/or direct the transient voltage to the ground reference using a resonant circuit. This can remove the transient voltage from the remainder of the circuit and protect the load(s), power sources, and the like. Flow of the method can then terminate or return to another operation, such as step 902 (when the next voltage transient occurs).

At step 910, a clipper assembly is activated. The controller may activate the clipper assembly in response to detecting the larger voltage transient. The clipper assembly may be activated by closing the activation switch of the positive clipper assembly (responsive to detection of a larger positive voltage transient) or closing the activation switch of the negative clipper assembly (responsive to detection of a larger negative voltage transient). The clipper assembly may be repeatedly activated and deactivated at a frequency that may exceed (e.g., be faster than) the frequency at which the switches of the inverter repeatedly activate and deactivate. At least part of the transient voltage can be dissipated by the clipper assembly that was activated and/or directed to the ground reference, as described above.

At step 912, the temperature of one or more resistors in the clipper assembly and/or the snubber assembly (e.g., the grounding resistor) is compared to a threshold temperature. As described above, the controller may receive temperature measurements from the sensor(s) and determine whether the temperatures indicate that the transient voltage is so large that the voltage is overheating the grounding resistor or the clipper resistor. If the temperature exceeds the threshold, flow of the method can flow toward step 914. Otherwise, flow of the method can return to another operation (such as step 902 when the next transient voltage occurs) or may terminate.

At step 914, the power sources are disconnected from the circuit of the powered system. For example, the controller can open the contactors between the power sources and the load(s) to disconnect the power sources. This can prevent the significant transient voltages that may be overheating the clipper resistor from damaging component of the powered system. Flow of the method may then terminate.

The control system may interface with external input, for example that relates to the operating environment of the system. The external operating data can be used to predict the likelihood and/or the magnitude of upcoming transient events. The control system can then, in one embodiment, switch modes from a first or normal operating mode to a second operating mode. In the second operating mode, the control system may be, for example, more aggressive in its protective actions, may act sooner to address a detected transient event, may being cooling system components in the expectation of a temperature rise from the protective activities, and the like. In some cases, the control system may disconnect sensitive circuits entirely if the predicted transient is above a determined threshold, such as beyond the ability of the protective circuit to handle the transient.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include voltage measurements, rates of change in the voltages, temperatures of resistors or other components, frequencies at which the activation switches of the clipper assemblies are switched on and off, etc. The neural network can be trained to generate an output based on these inputs, with the output representing an action or sequence of actions that the controller should take (e.g., activating or deactivating a clipper assembly, selecting the clipper assembly to activate, changing one or more thresholds described herein, etc.). During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the control system executes that plan to achieve the desired input data to mirror the predicted best outcome scenario. Additionally, the success metric may be a combination of optimized outcomes, which may be weighed relative to each other.

The controller can use this artificial intelligence or machine learning to receive input, use a model that associates locations with different operating modes to select an action, and then provide an output indicating the selected action (as described above). The controller may receive additional input that indicates whether the machine-selected action provided a desirable outcome or not. Based on this additional input, the controller can change the model, such as by changing which action would be selected when a similar or identical input is received the next time or iteration. The controller can then use the changed or updated model again to select an action, receive feedback on the selected action, change or update the model again, etc., in additional iterations to repeatedly improve or change the model using artificial intelligence or machine learning.

In accordance with one example or aspect, a power control system may include an inverter that may be coupled with a power source and receive an electric potential from the power source. The inverter may convert the electric potential into an alternating current supplied to a load via a conductive pathway. Positive and negative links may be connected with the inverter and may be connected with the power source to conduct the electric potential from the power source to the inverter. A first leg may conductively couple the positive and negative links. The first leg may include resistors disposed in series with each other and connected with a ground reference. A second leg may conductively couple the positive and negative links. The second leg may include capacitors disposed in series with each other and connected with the ground reference. The resistors and capacitors may be disposed in parallel with capacitances and resistances of the load and the conductive pathway coupling the inverter with the load. The resistors and the capacitors may reduce an impedance to the ground reference compared with the positive and negative links with the first leg but without the second leg.

Optionally, the resistors in the first leg may be connected with the ground reference at a first midpoint between the resistors. The capacitors in the second leg may be connected with the ground reference at a second midpoint between the capacitors. The resistors may include a positive resistor disposed in the first leg between the positive link and the first midpoint and the capacitors may include a positive capacitor disposed in the second leg between the positive link and the second midpoint. The positive resistor and the positive capacitor may be disposed in parallel to each other. The resistors may include a negative resistor disposed in the first leg between the negative link and the first midpoint and the capacitors may include a negative capacitor disposed in the second leg between the negative link and the second midpoint. The negative resistor and the negative capacitor may be disposed in parallel to each other. The resistors and the capacitors may reduce the impedance to the ground reference and reduce variances in the electric potential conducted between the power source and the inverter compared with the positive and negative links with the first leg but without the second leg.

In accordance with one example or aspect, a power control system may include an inverter that may be coupled with a battery and receive electric potential from the battery. The inverter may convert the electric potential into AC supplied to a traction motor via one or more cables. Positive and negative DC links may be connected with the inverter and may be connected with the battery to conduct the electric potential from the battery to the inverter. A first leg may conductively couple the positive and negative DC links. The first leg may include grounding resistors disposed in series with each other and connected with a vehicle ground reference. A second leg may conductively couple the positive and negative links. The second leg may include capacitors disposed in series with each other and connected with the vehicle ground reference. The resistors and capacitors may be disposed in parallel with stray capacitances and stray resistances of the traction motor and of the one or more cables. The grounding resistors and the capacitors may reduce an impedance to the vehicle ground reference compared with the positive and negative links with the first leg but without the second leg.

The grounding resistors in the first leg may be connected with the vehicle ground reference at a first midpoint between the grounding resistors and the capacitors in the second leg may be connected with the vehicle ground reference at a second midpoint between the capacitors. The first midpoint of the first leg may be connected with the second midpoint of the second leg. The grounding resistors may include a positive resistors disposed in the first leg between the positive DC link and the first midpoint and the capacitors may include a positive capacitor disposed in the second leg between the positive DC link and the second midpoint. The positive resistor and the positive capacitor may be disposed in parallel to each other. The grounding resistors may include a negative resistor disposed in the first leg between the negative link and the first midpoint and the capacitors may include a negative capacitor disposed in the second leg between the negative link and the second midpoint. The negative resistor and the negative capacitor may be disposed in parallel to each other. The grounding resistors and the capacitors may reduce the impedance to the vehicle ground reference and reduce variances in the electric potential conducted between the battery and the inverter compared with the positive and negative DC links with the first leg but without the second leg.

In accordance with one example or aspect, a power control system may include an inverter that may be coupled with a power source and receive electric potential from the power source. The inverter may convert the electric potential into AC supplied to a load via one or more cables. A circuit may include positive and negative DC links connected with the inverter and may be connected with the power source to conduct the electric potential from the power source to the inverter. The circuit may include a first leg conductively coupling the positive and negative DC link. The first let may include grounding resistors disposed in series with each other and connected with a vehicle ground reference. The circuit may include a second leg conductively coupling the positive and negative links. The second leg may include capacitors disposed in series with each other and connected with the vehicle ground reference. The load and the one or more cables may introduce stray capacitance and stray resistance into the circuit connecting the inverter with the power source. The resistors and the capacitors may be disposed in parallel with the stray capacitances and the stray resistance of the load and of the one or more cables. The grounding resistors and the capacitors may reduce an impedance to the vehicle ground reference compared with the positive and negative DC links with the first leg but without the second leg.

The resistors in the first leg may be connected with the ground reference at a first midpoint between the resistors and the capacitors in the second leg may be connected with the ground reference at a second midpoint between the capacitors. The first midpoint of the first leg may be connected with the second midpoint of the second leg. The resistors may include a positive resistor disposed in the first leg between the positive DC link and the first midpoint and the capacitors may include a positive capacitor disposed in the second leg between the positive DC link and the second midpoint. The resistors may include a negative resistor disposed in the first leg between the negative link and the first midpoint, and the capacitors may include a negative capacitor disposed in the second leg between the negative link and the second midpoint.

In one example, a power control system may include a snubber assembly that can be conductively coupled with one or more power sources and one or more loads in a location between the one or more power sources and the one or more loads. The power control system also may include a clipper assembly that can be conductively coupled with the one or more power sources and the one or more loads in the location between the one or more power sources and the one or more loads. The power control system may include a controller that can activate the clipper assembly responsive to detection of a voltage transient conducted from the one or more power sources. The controller can activate the clipper assembly to dissipate at least part of the voltage transient and to direct a remainder of the voltage transient to a ground reference responsive to the voltage transient exceeding a designated threshold. The snubber assembly may dissipate at least part of the voltage transient and direct a remainder of the voltage transient to the ground reference responsive to the voltage transient not exceeding the designated threshold.

The controller may deactivate the clipper assembly based on a temperature of the clipper assembly. The controller can repeatedly activate and deactivate the clipper assembly at a switching frequency, and the controller is configured to change the switching frequency based on a temperature of the clipper assembly. The clipper assembly can be a positive clipper assembly that may dissipate and direct the transient voltage to the ground reference while the transient voltage is a positive voltage transient and the snubber assembly can be a positive snubber assembly that may dissipate and direct the transient voltage to the ground reference while the transient voltage is the positive voltage transient.

The power control system also may include a negative clipper assembly that can dissipate and direct the transient voltage to the ground reference while the transient voltage is a negative voltage transient, and a negative snubber assembly that can dissipate and direct the transient voltage to the ground reference while the transient voltage is the negative voltage transient. The controller may activate the negative clipper assembly instead of the positive clipper assembly responsive to the voltage transient including both a negative voltage transient and a positive voltage transient.

The positive clipper assembly, the positive snubber assembly, the negative clipper assembly, and the negative snubber assembly may be connected to the ground reference with the ground reference between (a) the positive clipper assembly and the positive snubber assembly and (b) the negative clipper assembly and the negative snubber assembly. The controller can identify a fault in the one or more power sources based on a temperature of the clipper assembly.

The clipper assembly may include an activation switch and a clipper resistor. The controller can close the activation switch to direct the transient voltage to the clipper resistor and a grounding resistor between the clipper assembly and the ground reference. The snubber assembly may include a capacitor and the grounding resistor disposed in series with each other. The capacitor of the snubber assembly may be parallel to the activation switch and the clipper resistor.

Another example of a power control system may include a controller that can monitor voltage transients in a circuit of a powered system having one or more loads powered by one or more power sources. The controller can determine whether one or more of the voltage transients exceeds a threshold and, responsive to the one or more of the voltage transients exceeding the threshold, the controller may activate a clipper assembly configured to be conductively coupled with the one or more power sources and the one or more loads in the location between the one or more power sources and the one or more loads to dissipate at least part of the one or more of the voltage transients that exceed the threshold and to direct a remainder of the one or more of the voltage transients that exceed the threshold to a ground reference. The power control system also may include a snubber assembly that can dissipate at least part of the voltage transients that do not exceed the threshold and to direct a remainder of the voltage transients that do not exceed the threshold to the ground reference.

The controller may deactivate the clipper assembly responsive to a temperature of the clipper assembly exceeding a designated temperature threshold. The controller can repeatedly activate and deactivate the clipper assembly at a switching frequency, and the controller may change the switching frequency based on a temperature of the clipper assembly. The clipper assembly may be a positive clipper assembly that can dissipate and direct the transient voltage to the ground reference while the transient voltage is a positive voltage transient and the snubber assembly may be a positive snubber assembly that can dissipate and direct the transient voltage to the ground reference while the transient voltage is the positive voltage transient. The power control system also may include a negative snubber assembly that can dissipate and direct the transient voltage to the ground reference while the transient voltage is a negative voltage transient. The controller may activate a negative clipper assembly that can dissipate and direct the transient voltage to the ground reference while the transient voltage is a negative voltage transient.

The controller may activate the negative clipper assembly instead of the positive clipper assembly responsive to the voltage transient including both a negative voltage transient and a positive voltage transient. The controller may identify a fault in the one or more power sources based on a temperature of the clipper assembly.

A method may include deciding whether a voltage transient in a circuit of a vehicle exceeds a designated threshold, deciding whether the voltage transient in the circuit of the vehicle is a positive voltage transient or a negative voltage transient, activating a negative clipper assembly to reduce the voltage transient responsive to deciding that the voltage transient exceeds the threshold and is the negative voltage transient, activating a positive clipper assembly to reduce the voltage transient responsive to deciding that the voltage transient exceeds the threshold and is not the negative voltage transient, and dissipating at least part of the voltage transient via a snubber assembly responsive to deciding that the voltage transient does not exceed the threshold.

Optionally, the method may include measuring a temperature of the positive clipper assembly or the negative clipper assembly, and changing a switching frequency of the positive clipper assembly or the negative clipper assembly based on the temperature that is measured. The switching frequency may be reduced responsive to the temperature exceeding the threshold. The method may include identifying a fault in the circuit of the vehicle by monitoring temperatures of the positive clipper assembly or the negative clipper assembly over time.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B. (3) at least one C. (4) at least one A and at least one B. (5) at least one A, at least one B, and at least one C, (6) at least one B and at least one C. or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a snubber assembly configured to be conductively coupled with one or more power sources and one or more loads in a location between the one or more power sources and the one or more loads;
   a clipper assembly configured to be conductively coupled with the one or more power sources and the one or more loads in the location between the one or more power sources and the one or more loads; and
   a controller configured to activate the clipper assembly responsive to detection of a voltage transient conducted from the one or more power sources, the controller configured to activate the clipper assembly to dissipate at least part of the voltage transient and to direct a remainder of the voltage transient to a ground reference responsive to the voltage transient exceeding a designated threshold,
   the snubber assembly configured to dissipate at least part of the voltage transient and to direct a remainder of the voltage transient to the ground reference responsive to the voltage transient not exceeding the designated threshold.

2. The system of claim 1, wherein the controller is configured to deactivate the clipper assembly based on a temperature of the clipper assembly.

3. The system of claim 1, wherein the controller is configured to repeatedly activate and deactivate the clipper assembly at a switching frequency, and the controller is configured to change the switching frequency based on a temperature of the clipper assembly.

4. The system of claim 1, wherein the clipper assembly is a positive clipper assembly configured to dissipate and direct the transient voltage to the ground reference while the transient voltage is a positive voltage transient and the snubber assembly is a positive snubber assembly configured to dissipate and direct the transient voltage to the ground reference while the transient voltage is the positive voltage transient.

5. The system of claim 4, further comprising:

a negative clipper assembly configured to dissipate and direct the transient voltage to the ground reference while the transient voltage is a negative voltage transient; and a negative snubber assembly configured to dissipate and direct the transient voltage to the ground reference while the transient voltage is the negative voltage transient.

6. The system of claim 5, wherein the controller is configured to activate the negative clipper assembly instead of the positive clipper assembly responsive to the voltage transient including both the negative voltage transient and the positive voltage transient.

7. The system of claim 5, wherein the positive clipper assembly, the positive snubber assembly, the negative clipper assembly, and the negative snubber assembly are connected to the ground reference with the ground reference between (a) the positive clipper assembly and the positive snubber assembly and (b) the negative clipper assembly and the negative snubber assembly.

8. The system of claim 1, wherein the clipper assembly includes an activation switch and a clipper resistor, the controller configured to close the activation switch to direct the transient voltage to the clipper resistor and a grounding resistor between the clipper assembly and the ground reference, and the snubber assembly includes a capacitor and the grounding resistor disposed in series with each other.

9. The system of claim 1, further comprising:

an inverter configured to be coupled with the one or more power sources and receive an electric potential from the one or more power sources, the inverter configured to convert the electric potential into an alternating current supplied to the one or more loads via a conductive pathway;

a first leg conductively coupling a positive link with a negative link, the positive link and the negative link conductively coupled with the inverter, the first leg including capacitors disposed in series with each other and connected with the ground reference; and a second leg conductively coupling the positive and negative links, the second leg including resistors disposed in series with each other and connected with a ground reference;

the resistors and the capacitors disposed in parallel with capacitances and resistances of the one or more loads and of the conductive pathway coupling the inverter with the one or more loads.

10. The system of claim 9, wherein the resistors in the second leg are configured to be connected with the ground reference at a midpoint between the resistors.

11. The system of claim 9, wherein the resistors and the capacitors reduce an impedance to the ground reference and reduce variances in the electric potential conducted between the one or more power sources and the inverter compared with the positive and negative links with the first leg but without the second leg.

12. A system, comprising:

a controller configured to monitor voltage transients in a circuit of a powered system having one or more loads powered by one or more power sources, the controller configured to determine whether one or more of the voltage transients exceeds a threshold and, responsive to the one or more of the voltage transients exceeding the threshold, the controller is configured to activate a clipper assembly configured to be conductively coupled with the one or more power sources and the one or more loads in a location between the one or more power sources and the one or more loads to dissipate at least part of the one or more of the voltage transients that exceed the threshold and to direct a remainder of the one or more of the voltage transients that exceed the threshold to a ground reference; and a snubber assembly configured to dissipate at least part of the voltage transients that do not exceed the threshold and to direct a remainder of the voltage transients that do not exceed the threshold to the ground reference.

13. The system of claim 12, wherein the controller is configured to deactivate the clipper assembly responsive to a temperature of the clipper assembly exceeding a designated temperature threshold.

14. The system of claim 12, wherein the controller is configured to repeatedly activate and deactivate the clipper assembly at a switching frequency, and the controller is configured to change the switching frequency based on a temperature of the clipper assembly.

15. The system of claim 12, wherein the clipper assembly is a positive clipper assembly configured to dissipate and direct the transient voltage to the ground reference while the transient voltage is a positive voltage transient and the snubber assembly is a positive snubber assembly configured to dissipate and direct the transient voltage to the ground reference while the transient voltage is the positive voltage transient, further comprising:

a negative snubber assembly configured to dissipate and direct the transient voltage to the ground reference while the transient voltage is a negative voltage transient, wherein the controller is configured to activate a negative clipper assembly configured to dissipate and direct the transient voltage to the ground reference while the transient voltage is a negative voltage transient.

16. The system of claim 15, wherein the controller is configured to activate the negative clipper assembly instead of the positive clipper assembly responsive to the voltage transient including both the negative voltage transient and the positive voltage transient.

17. The system of claim 12, wherein the controller is configured to identify a fault in the one or more power sources based on a temperature of the clipper assembly.

18. The system of claim 12, further comprising:

an inverter configured to be coupled with the one or more power sources and receive electric potential from the one or more power sources, the inverter configured to convert the electric potential into an alternating current (AC) supplied to the one or more loads via one or more cables, the circuit including positive and negative direct current (DC) links connected with the inverter and configured to be connected with the one or more power sources to conduct the electric potential from the one or more power sources to the inverter, the circuit including a
first leg conductively coupling the positive and nega-
tive DC links, the first leg including capacitors dis-
posed in series with each other and connected with the
ground reference, the circuit including a second leg
conductively coupling the positive and negative links,
the second leg including grounding resistors disposed
in series with each other and connected with the ground
reference, the one or more loads and the one or more cables
introducing stray capacitance and stray resistance into
the circuit connecting the inverter with the one or more
power sources, and the grounding resistors and the capacitors disposed in
parallel with the stray capacitances and the stray resis-
tances of the one or more loads and of the one or more
cables, the grounding resistors and the capacitors
reducing an impedance to the ground reference com-
pared with the positive and negative DC links with the
first leg but without the second leg.

19. A method comprising:

deciding whether a voltage transient in a circuit of a
vehicle exceeds a designated threshold;

deciding whether the voltage transient in the circuit of the
vehicle is a positive voltage transient or a negative
voltage transient;

activating a negative clipper assembly to reduce the
voltage transient responsive to deciding that the voltage
transient exceeds the threshold and is the negative
voltage transient;

activating a positive clipper assembly to reduce the volt-
age transient responsive to deciding that the voltage
transient exceeds the threshold and is not the negative
voltage transient; and dissipating at least part of the voltage transient via a
snubber assembly responsive to deciding that the volt-
age transient does not exceed the threshold.

20. The method of claim 19, further comprising:

measuring a temperature of the positive clipper assembly
or the negative clipper assembly; and changing a switching frequency of the positive clipper
assembly or the negative clipper assembly based on the
temperature that is measured.

* * * * *